March 15, 1966  J. W. HICKS, JR  3,240,106
FIBER OPTICAL SCANNING DEVICE
Filed March 8, 1962  3 Sheets-Sheet 1
FIG. 1
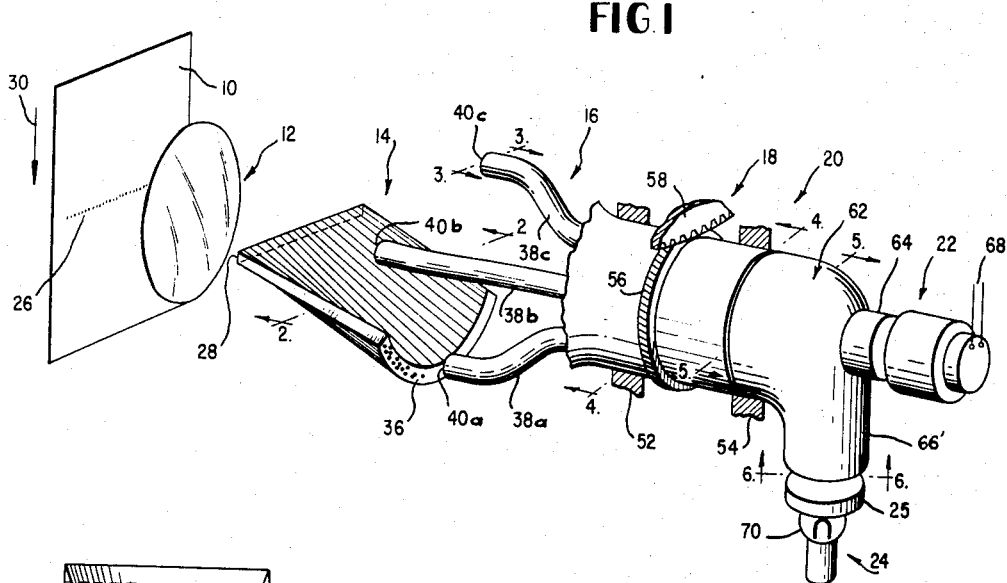
FIG. 2
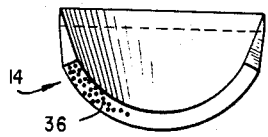
FIG. 3
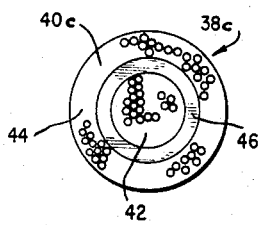
FIG. 4
FIG. 5
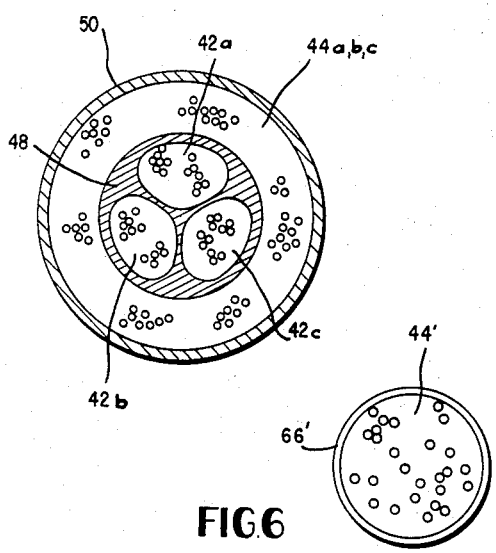
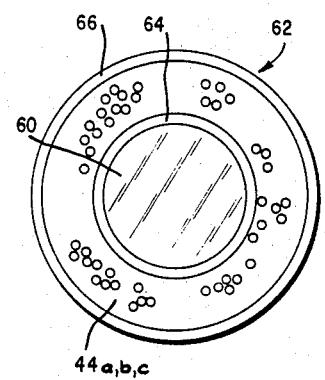
FIG. 6
INVENTOR.
JOHN W. HICKS, JR.
BY Stowell & Stowell
ATTORNEYS

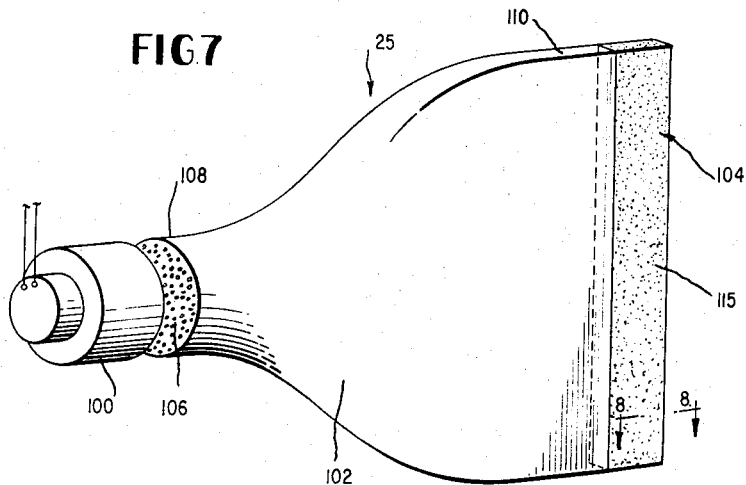
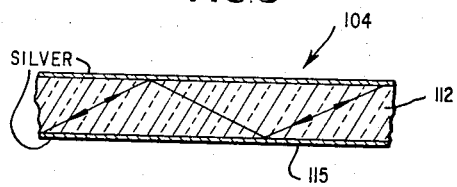
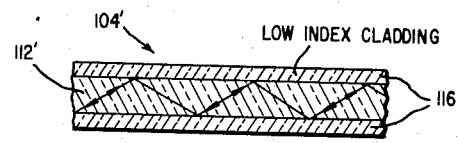
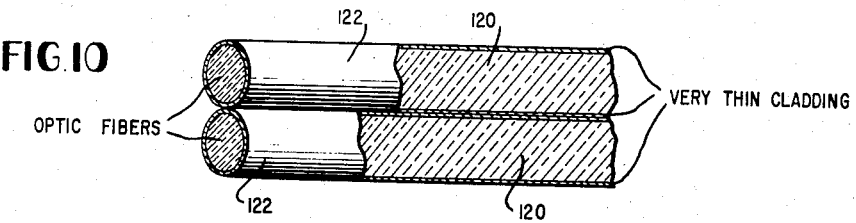
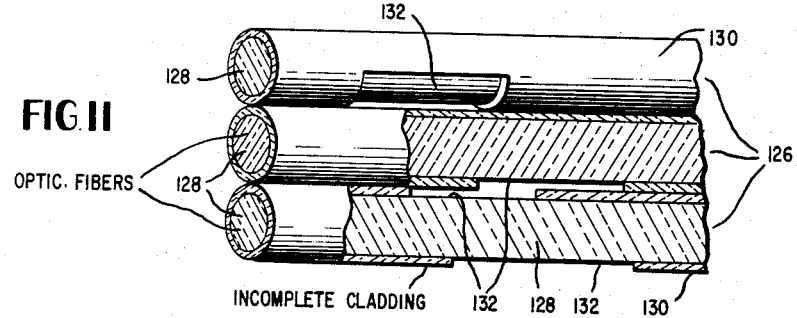
INVENTOR.
JOHN W. HICKS, JR.

United States Patent Office 3,240,106
Patented Mar. 15, 1966

1

3,240,106
FIBER OPTICAL SCANNING DEVICE
John Wilbur Hicks, Jr., Fiskdale, Mass., assignor to Mosaic Fabrications, Inc., Southbridge, Mass., a corporation of Massachusetts
Filed Mar. 8, 1962, Ser. No. 178,296
7 Claims. (Cl. 88—1)

This invention relates to improvements in fiber optical devices and in particular to illuminators and illuminator-scanner devices.

It is an object of the invention to provide improved means for transmission of light from a source thereof to an object to be illuminated; to provide improved means for scanning the illuminated object; and to provide improved means for converting a beam of light of rectilinear cross section to one of arcuate cross section.

These and other objects and advantages of the invention are provided by: a scanning device comprising a bundle of light transmitting fibers, means supplying light to one end of a portion of the fibers of the bundle, light responsive means in light receptive relation to the ends of the other portion of the fibers of the bundle and means for effecting relative movement between the other end of the bundle and an image to be scanned; and by a bundle of light transmitting fibers, each of the fibers of the bundle comprising a rod of light transmitting material provided with a surface coating having a lower index of refraction than the light transmitting rod, the fibers at one end of the bundle being arrayed in an extended rectilinear plane surface and the fiber ends at the other end of the bundle being arrayed in a plane surface extending along a curvilinear path normal to the longitudinal axes of the fibers, and by means interposed in the light path for diffusing the transmitted light.

The invention will be more particularly described with reference to the accompanying drawings wherein:

FIG. 1 is a perspective view with parts broken away of a scanner-illuminator embodying the principles of the invention;

FIG. 2 is a section on line 2—2 of FIG. 1;
FIG. 3 is a section on line 3—3 of FIG. 1;
FIG. 4 is a section on line 4—4 of FIG. 1;
FIG. 5 is a section on line 5—5 of FIG. 1;
FIG. 6 is a section on line 6—6 of FIG. 1;
FIG. 7 is a perspective view of a modified form of an illuminator incorporating the principles of the present invention;

FIG. 8 is a section on line 8—8 of FIG. 7;
FIG. 9 is a view similar to FIG. 8 of a modified form of the invention;

FIG. 10 is a greatly enlarged view of two fibers of a modified form of the device shown in FIG. 7;

FIG. 11 is a greatly enlarged view of three fibers of a further modification of a device similar to that shown in FIG. 7;

Figure 12:
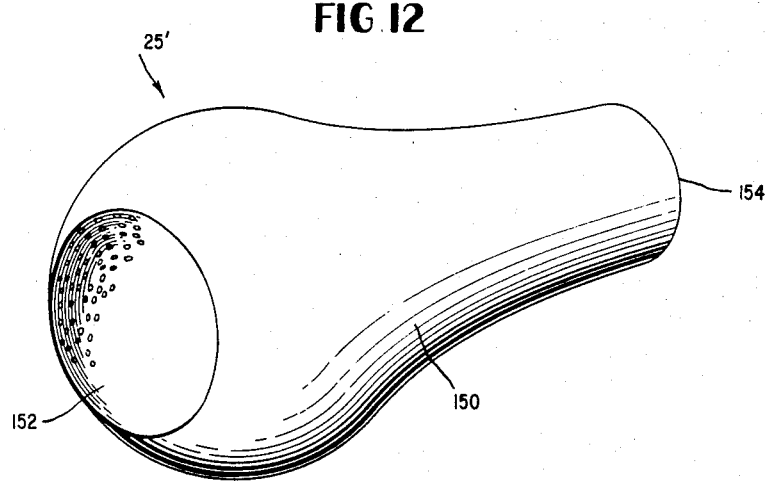
FIG. 12 is a perspective view of a fiber optical bundle for illuminating an extended surface from a point source of light.

Referring to FIGS. 1 through 6, there is illustrated an object 10 to be reproduced, a conventional optical projection lens system 12, a line-to-arc converter 14, rotating illuminator-scanner means 16, scanner drive means 18, image element and light transmitting means 20, light responsive means 22, light diffusing means 25, and a source of light 24.

In the illustrated form of the invention, the object 10 to be illuminated and scanned may comprise a document such as a printed page having rows of indicia 26.

2

The optical system 12 includes at least one lens for projecting an image of the indicia 26 or a portion thereof to be scanned on a face 28 of the line-to-arc converter 14 and, as will be more fully described hereinafter, for projecting light from the face 28 of the line-to-arc converter 14 to the indicia 26. When the material to be illuminated and scanned comprises a plurality of rows of indicia, means not shown are provided for sequentially or continuously bringing about register between the indicia to be illuminated and scanned and the face 28 of the line-to-arc converter. It will be appreciated that the means may comprise mechanical means for moving the object 10, for example, in the direction of the directional arrow 30 to bring about said register. It will also be appreciated that the object 10 may be maintained stationary and the lens system 12 may be pivoted to sequentially or continuously bring about the register of an image of the indicia with the face 28 of the line-to-arc converter.

It will also be apprecated by those skilled in the art that the lens system 12 is not essential and that satisfactory operation of the device is possible by direct transmission of the indicia 26 to face 28 of the line-to-arc converter 14. When no conventional optical system is used and when the line-to-arc converter 14 comprises a fiber optical bundle, the face 28 thereof should be as close as possible to the indicia 26.

Referring particularly to FIGS. 1 and 2, the line-to-arc converter comprises a fiber optical bundle, each fiber of which is composed of a light transmitting rod of, for example, five to fifty microns in diameter. Each of the fibers is provided with an intimate coating of material having a lower index of the refraction than that of the rod whereby light may be transmitted from end-to-end through each of the fibers with substantially little light loss. The fibers comprising the bundle may be manufactured as disclosed in U.S. patent application John W. Hicks, Jr., et. al., Serial No. 154,663 filed November 24, 1961, now United States Patent 3,146,082, dated August 25, 1964, for "Method of Making Light Conducting Fibers."

In order to obtain an accurate image reproduction of an object, the individual light conducting fibers of the line-to-arc fiber optical bundle 14 are arranged in predetermined geometrical patterns at the opposite ends of the bundle so that each image element at one end of the bundle will be reproduced in a predetermined relationship to adjacent image elements at the other end of the bundle. In the illustrated line-to-arc converter, the fibers at end 28 of the bundle are arranged to present an image receiving or emitting quadrangular planar surface, while the fibers at the opposite end 36 are warped into a curved path so that a rectilinear or line-like image received at face 28 is emitted from end 36 in a curved or arcuate form without disturbing the general relationship of the elements of the image from one end to the other of the bundle.

The line-to-arc converter may be conveniently constructed by first forming a fused rectilinear bundle of fiber optical elements and thereafter heating the fused bundle to a softening temperature in a suitable die which will deform end 36 into the desired arcuate array. After cooling, the ends 28 and 36 are ground and polished using conventional glass grinding and polishing techniques.

The scanning and illuminating portion 16 of the device comprises three fiber optical bundles 38a, 38b and 38c. Each of the fiber optical bundles 38a, b and c is identical in construction and end faces 40a, b and c are coplanar and spaced 120° apart on a circle of the same radius as that of the arcuate end surface 36 of the line-to-arc converter 14.

Referring to FIG. 3, each of the fiber optical devices 38a, b and c comprises an image element transmitting fiber optical group 42 and a light transmitting fiber optical group 44. In the preferred embodiment of the invention, the image transmitting fiber optical groups 42 form the center or core of each of the elements 38a–c while each of the light transmitting fiber optical groups 44 is positioned as a concentric sleeve about its associated image transmitting group. Further, as illustrated in FIG. 3, light shielding sleeve 46 may be included in each of the assemblies. Each of the insulating sleeves 46 may comprise a glass tube fused to each of the image transmitting groups 42. Each of the fibers of each of the image transmitting groups 42 and each of the fibers of the light transmitting groups 44 may comprise conventional fiber optical elements and may consist of a light transmitting glass rod provided with a glass cladding having a lower index of refraction than the index of refraction of the light transmitting rods.

Rearwardly of the ends 40a, b and c of the scanning device 16 the three groups 42a, b and c of image transmitting fibers are consolidated to form a single central core 48 as illustrated in FIG. 4, while the light transmitting fibers 44a, b and c form an annulus about the image transmitting fiber groups. The outer surface of the light transmitting annulus may be provided with a protective sleeve 50. The assembly is suitably mounted for rotation in, for example, bearing members 52 and 54 as illustrated in FIG. 1, while suitable drive means comprising ring gear 56 and drive gear 58 are provided for rotating the scanning and illuminating heads 40a, b and c past the arcuate face 36 of the line-to-arc converter 14.

It will be appreciated that the spacing between the faces 40a, b and c and the surface 36 of the line-to-arc converter is maintained at a minimum to reduce the air space through which the light must be transmitted in the passage of image elements or light between the scanning heads and the surface 36 of the line-to-arc converter. The three image transmitting groups 42a, b and c transfer the image elements to an image element transmitting member 60 centrally mounted in end member 62 of the scanner illuminator device. The member 60 may comprise a high index of refraction glass rod provided with a lower index of refraction sleeve 64. The end member 62 may also be suitably provided with a protective jacket 66.

The rod 60 with its insulating and low refractive index coating 64 terminates adjacent a light sensing device 22 which may comprise a conventional photosensitive device such as a photoelectric multiplier tube provided with electrical impulse conductors 68 which may be connected to suitable printing, typing, transmitting or television type receiving apparatus forming no specific part of the present invention.

The light transmitting fiber groups 44a, b and c are regrouped as at 44' in FIG. 6 and provided with a protective sheath 66'. The fiber group 44' may terminate in a light receiving position with respect to a source of illumination 24 illustrated as incandescent light 70 and some form of light diffusing means 25 may be positioned between the end of fiber group 44' and the light source.

In operation of the improved scanning-illuminating device hereinabove described, a document 10 to be copied is mounted in the optical path of the optical system 12. The light 70 is energized, and the drive means connected to gear 58 is energized to rotate the scanning-illuminating members 38a, b and c at a suitable scanning speed. The light from the source 70 is transmitted from the light receiving end of the fiber bundle 44' to the fiber groups 44a, b and c in end member 62, thence to fiber bundles 44a, b and c in the rotating body portion 18 of the scanner. Thence the light is transmitted via the fibers to the ends of the individual scanning heads 40a, b and c whereby as each head passes in register along the surface 36 of the line-to-arc converter, the light emitted from the fiber group is transmitted through the fibers in the line-to-arc converter to the surface 28 thence the light is projected by lens system 12 to the indicia 26 to be illuminated. At the same time, image elements of the illuminated indicia are projected on the face 28 of the line-to-arc converter 14 and transmitted through the fibers thereof to the arcuate surface 36, thence through the image transmitting bundle 42a, b or c then in register with the surface 36 of the line-to-arc converter. The scanned image elements are transmitted by the light transmitting rod 60, to the light sensitive element of the photoelectric sensing means 22, and the resulting electrical impulse is transmitted to suitable receiving means.

From the foregoing description of a specific embodiment of the present invention and its operation, it will be appreciated by those skilled in the art that the scanner-illuminator may comprise less or more than the three illustrated scanning and illuminating heads without departing from the scope of the present invention.

In the structure illustrated in FIGS. 1 through 6, means 25 is employed to insure substantially uniform illumination of the portion of the object being scanned. Where the object to be reproduced has gradations in object tone, color or intensity as occur, for example, in a photographic print, it is desirable in order to accurately reproduce an image of the object to employ a uniform source of illumination. A uniform source of illumination may be provided by including in the light transmitting fiber optical system light diffusing means 25. Suitable light diffusing means 25 are illustrated in FIGS. 7 through 11.

Referring to FIG. 7, there is illustrated a source of illumination 100, a light transmitting fiber optical bundle 102 and a light diffusing element 104. The bundle of optical fibers 102 includes a plurality of individual light conducting rods 106 each of which is provided with an intimate coating of material having a lower index of refraction. In the illustrated form of the invention, the fibers of the fiber bundle are massed in a cylindrical array at end 108 of the bundle and in a quadrangular array at end 110 of the bundle. Light from the light source 100 projected upon the end faces of the individual light transmitting fiber rods 106 at end 108 is transmitted through each fiber of the bundle to the opposite end. In such an array certain of the light transmitting rods may have imperfections therein or in the light reflecting coatings thereon and the positions of the ends of the fibers relative to the light source 100 may not be uniform whereby the intensity of the light emitted over the end surface 110 of the light transmitting bundle 102 will not be uniform.

It has been found that by transmitting the light emitted from the end 110 of such a light transmitting bundle through a relatively short light diffusing section, more uniform illumination may be achieved. Referring to FIG. 8, a suitable light diffusing element 104 may comprise a quadrangular cavity 112, which is coextensive with the quadrangular end 110, and bound by light reflecting silvered surfaces 115. Light emitted from the light emitting end of the fibers at bundle end 110 will be diffused in passing through the cavity 112 bound by the light reflecting surfaces to provide substantially uniform illumination at the output end thereof.

A similar light diffusing element 104' is illustrated in FIG. 9 where the light transmitting cavity 112 of FIG. 8 is replaced by a quadrangular high refractive index glass plate 112' and the silvered surfaces 115 of the diffuser 25 of FIG. 8 are replaced by a low index of refraction cladding 116. Both of the devices illustrated in FIGS. 8 and 9 function in the same manner to diffuse the light emitted from the fibers at end 110 to provide more uniform illumination.

It has also been discovered that suitable light diffusion also may be obtained by replacing the diffuser elements 104 or 104' with one of the light diffusing structures illustrated in FIGS. 10 or 11 or by constructing the fiber bundle 102 as illustrated in FIGS. 10 and 11. Referring specifically to FIG. 10, there is shown two fibers of a fiber bundle, each fiber consisting of a high index of refraction glass rod 120 provided with a cladding 122 of glass having a lower index of refraction. The claddings 122 are drawn very thin in forming the fibers whereby the light being transmitted through the light transmitting rods 120 is not confined entirely within the rods but some of the light passes through the thin claddings into adjacent rods thus producing a bundle in which light is partially reflected and partially refracted at each wall and thereby gradually diffused over an ever-increasing area. In general, this diffusion will take place where the cladding is less than, for example, about 1/10 to about 1/30 micron in thickness.

In FIG. 11 there is illustrated another method of providing cross diffusion of the light in each of the light transmitting channels whereby the light being transmitted through the fiber bundle is partially reflected at each wall and partially diffused into adjacent light conducting channels. In this form of the invention, each of the light transmitting fibers 126 consists of a high index of refraction light transmitting rod 128 provided with a lower index of refraction coating 130. The low index of refraction claddings 130 of the fibers 126 are drawn discontinuously to provide unclad areas 132 whereby light being transmitted through the rod is partially reflected and partially refracted into adjacent channels. Such a structure has the desired property of channelling the light sufficiently to transmit the light around bends and at the same time permit more or less mixing or diffusion of the light as it is transmitted through the rods. The degree of mixing or diffusion will depend on the degree of discontinuity of the wall claddings. Thus a structure constructed as illustrated in FIG. 11 may be employed as the light transmitting fiber bundles 102 of FIG. 7 or as the mixing chamber 104 thereof.

A suitable method of making the light transmitting fibers 126 with discontinuous claddings 130 to provide unclad areas 132 thereon comprises substituting a glass rod for the conventional glass tubes employed in the prior art cladding procedures such as disclosed in U.S. patent application Serial No. 154,663 filed November 24, 1961, J. W. Hicks, Jr., et al. The glass, to form the cladding, and the glass rod to form the light transmitting fiber are heated to a drawing temperature. In the heating zone the cladding rod is caused to flow about the light transmitting rod whereby when the elements are drawn a unitary structure is provided consisting of a light transmitting glass rod having a glass coating of a lower index of refraction. To render the cladding discontinuous the cladding rod is intermittently urged from the heating and drawing zone. By controlling the rate of removal, the removal period, and the drawing rate the extent and frequency of the unclad areas 132 are readily controlled.

Figure 13:
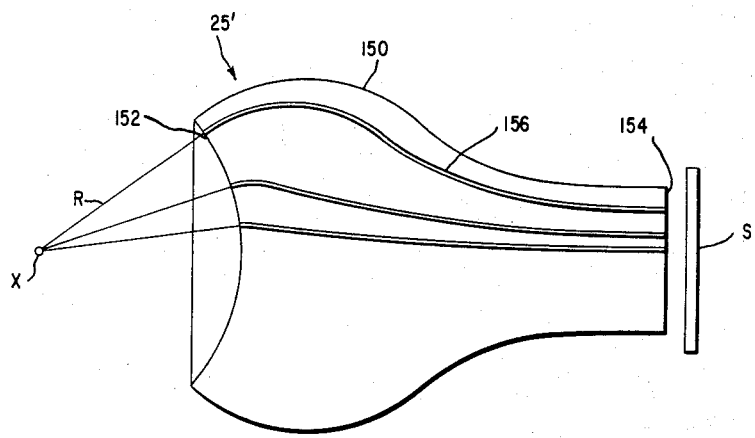
FIG. 13 is a diagrammatic sectional view of the device shown in FIG. 12.

A further form of light equalizing means is illustrated in FIGS. 12 and 13. Referring to these figures, the bundle 150 of fiber optical elements 156 has a light receiving end 152 and a light emitting end 154. The fibers 156 of the bundle each comprise a light transmitting rod consisting of a high index of refraction glass provided with a glass coating having a lower index of refraction than the rod. In the formation of end 152 of the fiber bundle 150, each end of each of the fibers 156 is oriented about an arc having a radius R from a point X so that the longitudinal axis of the end portion of each of the fibers is radially aligned with or directed toward the point X. With this form of construction, each of the fibers 156 of the bundle 150 will substantially uniformly receive light from a point source X. At the remote end 154 of the bundle 150, the fibers 156 are positioned with their axes in a generally parallel array whereby an area S is uniformly illuminated from the point source X.

The device illustrated in FIGS. 12 and 13 may include a diffusing or mixing chamber such as illustrated in FIG. 8 or FIG. 9 or the fibers 156 of the bundle 150 may be constructed as illustrated in FIGS. 10 and 11.

From the foregoing description of the present invention, it will be appreciated by those skilled in the art that new and useful improvements in fiber optical devices have been provided. It will also be appreciated that various modifications may be made in the specific forms of the fiber optical devices shown in the application drawings without departing from the scope of the appended claims.

I claim:

1. A scanning device comprising a first bundle of light transmitting fibers, means supplying light to one end face of a portion of the fibers of the first bundle, light responsive means in light receptive relation to the same end face of the other portion of the fibers of the first bundle, the other end face of said first bundle being offset with respect to the one end face and generally parallel therewith, means for rotating said first bundle of light transmitting fibers about an axis normal to the one end face thereof to provide relative rotation between the other end face of the first bundle and an object to be scanned, a second bundle of light transmitting fibers positioned between the other end face of the first bundle and the object to be scanned and adapted to dispose an image of the object to be scanned in a portion of the arcuate path of rotation of said other end face of the first bundle, each of the fibers of the second bundle of light transmitting fibers comprising a rod of light transmitting material provided with a surface coating having a lower index of refraction than the light transmitting rods, the fibers at the object end face of the second bundle being arrayed in an extended rectilinear plane surface and the fibers at the other end face of the second bundle being arrayed in a plane surface extending along only a portion of the arcuate path of movement of the other end face of the first rotating bundle of light transmitting fibers.

2. The invention defined in claim 1 wherein the other end face of the first bundle of light transmitting fibers comprises three light transmitting fiber bundles, each of the three light transmitting fiber bundles being coplanar and spaced 120° apart on a circle of the same radius as the arc of the curvilinear surface of the other end face of the second bundle of light transmitting fibers.

3. A scanning device comprising a first bundle of light transmitting fibers, means supplying light to one end face of a portion of the fibers of the first bundle, light responsive means in light receptive relation to the same end face of the other portion of the fibers of the first bundle, the other end face of said first bundle being offset with respect to the one end face and generally parallel therewith, and means for rotating the first bundle of light transmitting fibers about an axis normal to the one end face thereof, and a second bundle of light transmitting fibers positioned between the said other end face of the first bundle and the object to be scanned adapted to dispose an image of the object to be scanned in a portion of an arcuate path of said other end face of the first bundle, each of the fibers of the second bundle of the light transmitting fibers comprising a rod of light transmitting material provided with a surface coating having a lower index of refraction than the light transmitting rod, the fibers at one end face of the second bundle being arrayed in an extended rectilinear plane surface and the fiber ends at the other end face of the second bundle being arrayed in a plane surface extending along only a portion of the arcuate path of movement of the said other end face of the first bundle.

4. The invention defined in claim 3 wherein the means supplying light to said one end face of a portion of the fibers of the first bundle includes means for diffusing light transmitted through light transmitting rods.

5. The invention defined in claim 4 wherein said means for diffusing the light transmitted through the light transmitting rods includes a chamber having internal light reflecting surfaces.

6. The invention defined in claim 4 wherein the means for diffusing the transmitted light includes a bundle of light transmitting fibers each comprising a rod of light transmitting material provided with a discontinuous surface coating having a lower index of refraction than the rods.

7. The invention defined in claim 4 wherein the means for diffusing transmitted light comprises a bundle of light transmitting fibers, each of the fibers of the bundle comprising a rod of light transmitting material provided with a surface coating having a lower index of refraction than the light transmitting rod, said coating being not greater than about 1/10 micron in thickness.

References Cited by the Examiner

UNITED STATES PATENTS

| 3,033,071 | 5/1962 | Hicks | 88—1 |
| 3,036,153 | 5/1962 | Day | 88—1 X |
| 3,043,179 | 7/1962 | Dunn | 88—1 |
| 3,068,739 | 12/1962 | Hicks et al. | 88—1 |

JEWELL H. PEDERSEN, *Primary Examiner.*